No. 861,012. PATENTED JULY 23, 1907.
E. F. W. ALEXANDERSON.
ALTERNATING CURRENT MOTOR.
APPLICATION FILED DEC. 10, 1906.

Witnesses:
Irving E. Steers.
J. Ellis Glen.

Inventor
Ernst F. W. Alexanderson,
by Albert G. Davis
Att'y.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

ALTERNATING-CURRENT MOTOR.

No. 861,012.  Specification of Letters Patent.  Patented July 23, 1907.

Application filed December 10, 1906. Serial No. 347,024.

*To all whom it may concern.*

Be it known that I, ERNST F. W. ALEXANDERSON, a subject of the King of Norway and Sweden, residing at Schenectady, in the county of Schenectady, State of New York, have invented certain new and useful Improvements in Alternating-Current Motors, of which the following is a specification.

My invention relates to dynamo-electric machines of the commutator type, employing high resistance-leads for the purpose of improving commutation, and is particularly applicable to alternating-current motors of the commutator type.

The object of my invention is to arrange the leads in such manner that the heat produced in these leads, particularly at starting, may be effectively conducted away; thereby making it possible to employ leads of comparatively small cross-section.

My invention in its broadest aspect consists in arranging the leads in the same slots with the coils and placing each lead close to a conductor of one of the coils in the slot and separated from the conductor only by a thin strip of insulation. A portion of the heat generated in the lead is transferred through the thin strip of insulation to the coil conductor, so as to reduce the temperature of the lead. If the lead is placed close to one of the conductors of the coil to which it is connected, so that the lead and conductor are in close mutually inductive relation, the voltage between the lead and conductor at any time is only that due to the ohmic drop, and consequently the insulation between them may be very thin. I further increase conduction of heat from the lead by forming both the lead and the conductor of thin strips, so that they present to each other heat-conducting surfaces of comparatively large area. When a plurality of coils are placed in each slot, the leaves are interleaved with the coil-conductors at the bottom of the slot.

Figure 1:
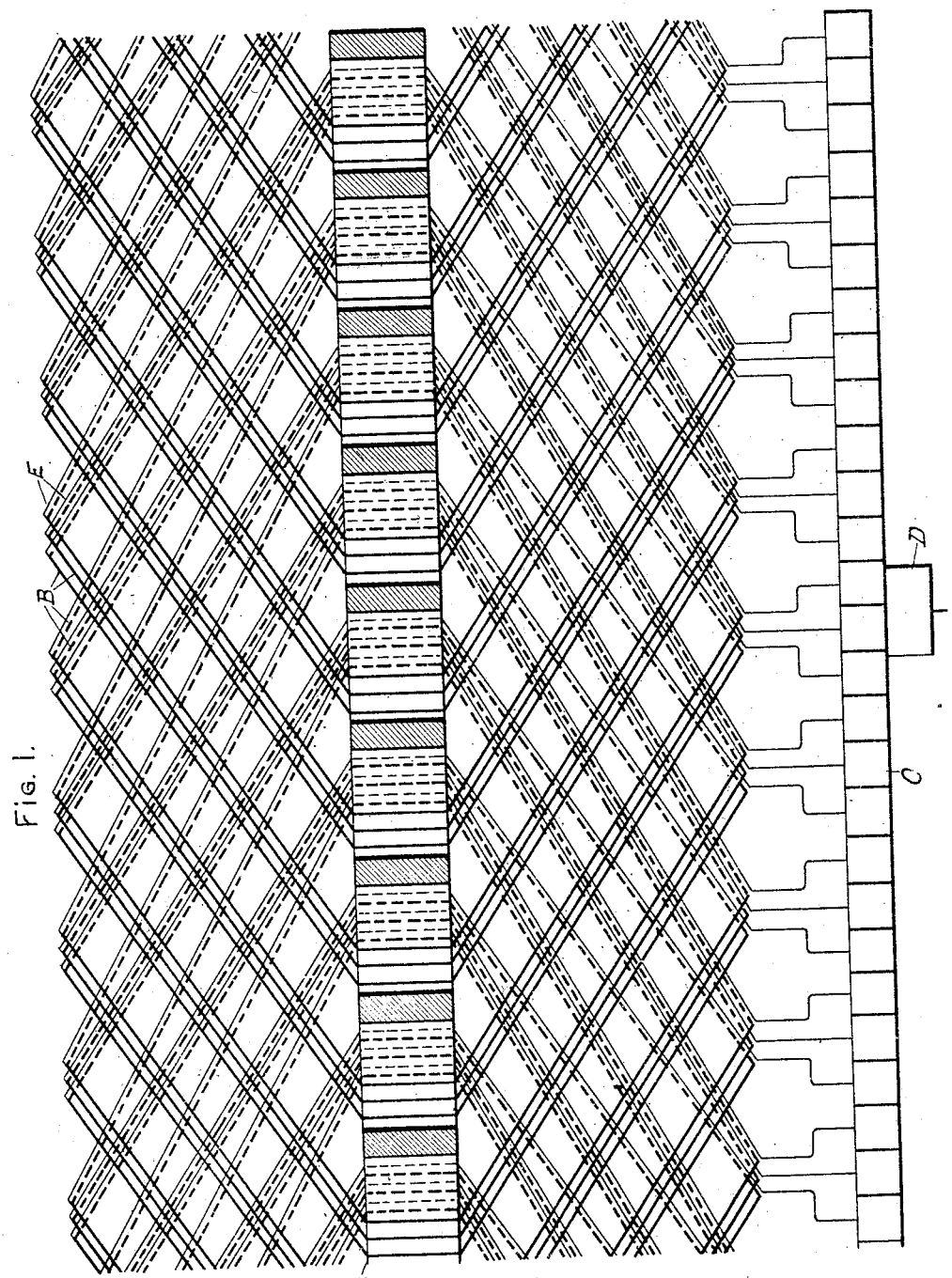
Figure 2:
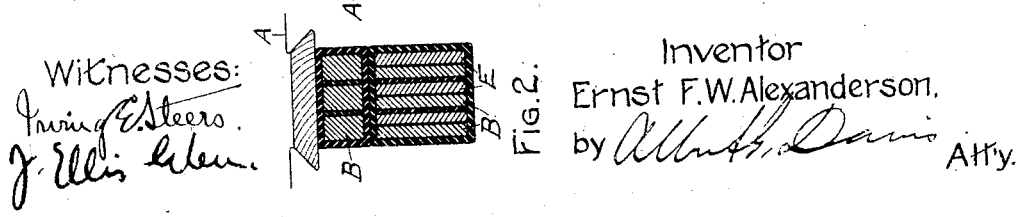

My invention will best be understood by reference to the accompanying drawing, in which Figure 1 shows diagrammatically a development on a plane surface of an armature winding provided with high resistance-leads arranged in accordance with my invention; and Fig. 2 shows a cross-sectional view of the coil-conductors and leads in a slot.

In Fig. 1, A represents the slotted armature core, B the coils carried in the slots, C the commutator, D the commutator brush, and E the high-resistance leads which are of a suitable high-resistance material and are connected to the coils on the side of the armature away from the commutator. The coils B are shown in heavy lines; the conductors which are in the top of the slots, being shown in full lines, and the conductors which are in the bottom of the slots in dotted lines. The high-resistance leads are shown in light lines.

The arrangement of the conductors of the coils and of the leads in the slots is clearly shown in Fig. 2. In this figure, as in Fig. 1, six coil-conductors per slot and three leads per slot are shown. The coil-conductors in the top of the slot are shown as of the usual cross-section, while the conductors in the bottom of the slot, and also the high-resistance leads, are shown in the form of narrow strips. The leads are interleaved with the conductors and each lead is separated from a conductor of the coil to which it is connected only by a thin strip of insulation. As has been above explained, this insulation need be only sufficient in thickness to resist the voltage due to the ohmic drop in the conductor of the coil and in the lead, since lead and conductor are in close mutual relation, as shown in Fig. 1.

What I claim as new and desire to secure by Letters Patent of the United States, is,—

1. In a dynamo-electric machine, a slotted armature, coils carried in the slots, a commutator, and high-resistance leads carried in the slots and connecting the coils to the commutator, each lead being arranged close to a conductor of one of the coils and separated therefrom only by a thin strip of insulation.

2. In a dynamo-electric machine, a slotted armature, coils carried in the slots, a commutator, and high-resistance leads connecting the coils to the commutator and interleaved with the coil-conductors in the bottom of the slots, each lead being separated from a coil-conductor only by a thin strip of insulation.

3. In a dynamo-electric machine, a slotted armature, coils carried in the slots, a commutator, high-resistance leads carried in the slots and connecting the coils to the commutator, each lead being arranged close to a conductor of the coil to which it is connected and separated therefrom only by a thin strip of insulation.

4. In a dynamo-electric machine, a slotted armature, coils carried in the slots, a commutator, and high-resistance leads connecting the coils to the commutator and interleaved with the coil-conductors in the bottom of the slots, each lead being separated from a conductor of the coil to which it is connected only by a thin strip of insulation.

5. In a dynamo-electric machine, a slotted armature, coils carried in the slots, a commutator, high-resistance leads carried in the slots and connecting the coils to the commutator, each lead and a conductor of each coil being in the form of thin conducting strips and the two being separated by only a thin strip of insulation.

6. In a dynamo-electric machine, a slotted armature, coils carried in the slots, a commutator, high-resistance leads connecting the coils to the commutator and interleaved with the coil-conductors in the bottom of the slots, each lead and a conductor of each coil being in the form of thin conducting strips and the two being separated by only a thin strip of insulation.

7. In a dynamo-electric machine, a slotted armature, coils carried in the slots, a commutator, high-resistance leads carried in the slots and connecting the coils to the commutator, each lead being arranged close to a conductor of the coil to which it is connected and separated therefrom only by a thin strip of insulation, both the lead and the conductor being in the form of thin conducting strips.

8. In a dynamo-electric machine, a slotted armature, coils carried in the slots, a commutator, and high-resistance leads connecting the coils to the commutator and interleaved with the coil-conductors in the bottom of the slots, each lead being separated from a conductor of the coil to which it is connected only by a thin strip of insulation, both the lead and the conductor being in the form of thin conducting strips.

In witness whereof, I have hereunto set my hand this 8th day of December, 1906.

ERNST F. W. ALEXANDERSON.

Witnesses:
BENJAMIN B. HULL,
HELEN ORFORD.